(12) United States Patent
Girgenti

(10) Patent No.: US 6,889,768 B2
(45) Date of Patent: May 10, 2005

(54) SEALING COMPOSITION

(75) Inventor: Darrell Girgenti, Mampang Jakarta (ID)

(73) Assignee: Halliburton Energy Services, Inc., Duncan, OK (US)

( * ) Notice: Subject to any disclaimer, the term of this patent is extended or adjusted under 35 U.S.C. 154(b) by 42 days.

(21) Appl. No.: 10/386,264

(22) Filed: Mar. 11, 2003

(65) Prior Publication Data

US 2004/0177964 A1 Sep. 16, 2004

(51) Int. Cl.$^7$ ............................................... E21B 33/13
(52) U.S. Cl. ...................................... 166/294; 166/293
(58) Field of Search ................................ 166/294, 293, 166/292

(56) References Cited

U.S. PATENT DOCUMENTS

| 4,659,750 | A | * | 4/1987 | Sedillo et al. ............... 523/130 |
| 4,683,952 | A | * | 8/1987 | Peiffer et al. ................ 166/293 |
| 5,335,726 | A | | 8/1994 | Rodrigues .................... 166/295 |
| 5,358,051 | A | | 10/1994 | Rodrigues .................... 166/295 |
| 5,389,706 | A | * | 2/1995 | Heathman et al. ........... 166/293 |
| 5,836,392 | A | | 11/1998 | Urlwin-Smith ............... 166/295 |
| 6,059,036 | A | * | 5/2000 | Chatterji et al. ............. 166/294 |
| 6,192,986 | B1 | | 2/2001 | Urlwin-Smith ............... 166/295 |
| 6,196,317 | B1 | | 3/2001 | Hardy .......................... 166/295 |
| 6,681,856 | B1 | * | 1/2004 | Chatterji et al. ............. 166/294 |
| 2001/0020057 | A1 | | 9/2001 | Audibert et al. ................ 524/2 |
| 2003/0008779 | A1 | | 1/2003 | Chen et al. ................... 507/200 |

FOREIGN PATENT DOCUMENTS

| EP | 0342500 A2 | 11/1989 | ............ E21B/33/13 |
| EP | 1319798 A1 | 6/2003 | ......... E21B/33/138 |

OTHER PUBLICATIONS

Halliburton brochure entitled "The PermSeal™ System, Versatile, Cost–Effective Sealants for Conformance Applications", 4 pages, Jun. 1997.

* cited by examiner

*Primary Examiner*—David Bagnell
*Assistant Examiner*—Elton McWilliams
(74) *Attorney, Agent, or Firm*—Robert A. Kent; Randall C. Brown

(57) ABSTRACT

A method and composition is provided for sealing a subterranean zone penetrated by a well bore, wherein the sealing position comprises a mixture of gelling material, water, and cementitious material.

14 Claims, No Drawings

SEALING COMPOSITION

BACKGROUND

The present embodiment relates generally to a sealing composition for sealing a subterranean zone penetrated by a well bore.

In the drilling and completion of an oil or gas well, conventional means are used to isolate the well bore into subterranean mes. Thereafter, the undesirable migration of fluids between zones is prevented. However, over the life of the well, tectonic events, changes in pressure or temperature in the well bore, and the development of problems involving undesirable formations in the zones, can result in compromised mal isolation.

Likewise, a zone in a well may begin to produce undesirable fluids, such as gas or water, which requires a remedial shut off operation. Using a diversion technique, a shut off fluid used to prevent or cure compromised anal isolation is forced into sequences of relatively lower permeability in the zone by "diverting" the fluid from sequences of relatively higher permeability. Without diversion, the sequences of relatively higher permeability would receive all of the treatment fluid.

In the past, diversion techniques used for shut off operations relied on timing fluid gelation, varying injection rate, and increasing fluid viscosity. However, a sealing composition having superior sealing properties is desirable for diversion techniques and other remedial operations.

DESCRIPTION

A sealing composition for sealing a subterranean zone penetrated by a well bore according to the present embodiment comprises a mixture of gelling material, water, and cementitious material. It is understood that the gelling material maybe a conventional crosslinked polymer, or other phase-changing material that forms a gel.

In a first embodiment, the gelling material is a copolymer of acrylamide and t-butyl acrylate, crosslinked by adding polyethylene imine. Together, the copolymer of acrylamide and t-butyl acrylate and polyethylene imine activator are available from Halliburton Energy Services of Duncan, Okla., under the trademark "H₂ZERO™." Such gelling material is described in U.S. Pat. Nos. 5,836,392, 6,192,986, and 6,196,317, the entire disclosures of which are incorporated herein as if reproduced in their entireties. In this embodiment, the gelling material is preferably present in a range of 3 mass percent to 10 mass percent of the sealing composition.

In a second embodiment, the gelling material is a 2-hydroxy ethyl acrylate monomer, activated by a water soluble azo compound, such as 2,2'-Azobis(N,N'-dimethylene isobutyramidine)dihydrochloride, 2,2'-Azobis(2-amidinopropane)dihydrochloride or 2,2'-Azobis(2-methyl-N-(2-hydroxethyl)propionamide). Together, the 2-hydroxy ethyl acrylate monomer and water soluble azo compound are available from Halliburton Energy Services of Duncan, Okla., under the trademark "PERMSEAL™." Such gelling material is described in U.S. Pat. Nos. 5,358,051 and 5,335,726, the entire disclosures of which are incorporated herein as if reproduced in their entireties. In this embodiment, the gelling material is preferably present in a range of 0.3 mass percent to 10 mass percent of the sealing composition.

The water in the sealing composition can be fresh water or unsaturated salt solution, including brines and seawater. Generally, any type of water can be used, provided that it does not contain an excess of compounds well known to those skilled in the art, that adversely affect properties of the sealing composition. The water is present in a range of about 85 mass percent to 97 mass percent of the sealing composition.

The cementitious material maybe cement, fly ash, spherelite, or any other such material.

A variety of cements can be used with the present embodiment, including cements comprised of calcium, aluminum, silicon, oxygen, and/or sulfur, which set and harden by reaction with water ("hydraulic cements"). Such hydraulic cements include Portland cements, pozzolan cements, gypsum cements, aluminous cements, silica cements, and alkaline cements. Portland cements of the type defined and described in API Specification 10, $5^{th}$, Edition, Jul. 1, 1990, of the American Petroleum Institute (the entire disclosure of which is hereby incorporated as if reproduced in its entirety) are preferred. API Portland cements include Classes A, B, C, G, and H, of which API Class G is particularly preferred for the present embodiment. It is understood that the desired amount of cement is dependent on the volume required for the diversion technique, but normally is in a range of 0.5 pounds ("lb") per barrel (42 U.S. gallons; hereinater "bbl") to 20 lb/bbl of the fluid comprising the gelling material and water. Preferably, the cement is present in a range of 0.005 mass percent to 0.5 mass percent of the sealing composition.

In operation, a shut off technique is used for a zone in a well bore that contains sequences of varying permeability, the zone being isolated by conventional methods. Due to the varying permeability, efficacious shut off is only obtained if the sealing composition is diverted to lower permeability sequences. A sealing composition comprising gelling material, water, and cement in the above-described ranges produces such a diversion.

The total volume of sealing composition required for a particular well depends on the individual characteristics of a particular well, but in any case, the necessary volume can be readily calculated by conventional means well known to those of ordinary skill in the art. In one embodiment, the gelling material is activated copolymer of acrylamide and t-butyl acrylate. In another embodiment, the gelling material is activated 2-hydroxy ethyl acrylate monomer.

The sealing composition can be placed in the me to stop production of undesirable fluids.

Alternatively, the operation maybe carried out in a two step manner. First, a treatment fluid comprising gelling material and water can be prepared. Approximately half of the volume of the treatment fluid is pumped down hole, resulting in deep penetration of the highest permeability sequences. It is understood that there will be substantially less penetration of the lowest permeability sequences. Second, after approximately half of the treatment fluid has been pumped, slugs comprising cement and gelling material treatment fluid, having a cement concentration of 4 lb/bbl of treatment fluid, is pumped down hole. In one embodiment, each slug may have a volume of 2 barrels, or the equivalent to theoretically shut off a 4: foot section of perforated 7 inch production casing.

The technique is finished when all of the perforations (from highest to the lowest permeability sequences) have been penetrated with the treatment fluid, and have become plugged with a cement "filter cake," as can be determined by conventional methods, such as pressure increases. The well may be shut in thereafter to allow time for the filter cake to set and the gelling material to gel. As the filter cake has a much greater concentration of cement than the sealing composition prepared at the surface, the filter cake will set hard within 48 hours of completion of the technique.

Although this theory is not meant to limit the invention in any way, the Applicant believes that the relatively low concentration of cement in the sealing composition allows the cement to enter perforations in the highest permeability sequences along with the gelling material and water. Continued entry of fluids into the perforations causes a filter cake to build up on the formation around the highest permeability sequences, discouraging further entry of the sealing composition. As a result, the fluids are diverted to the relatively lower permeability sequences.

The following examples are illustrative of the methods and compositions discussed above.

EXAMPLE 1

To test for collection of filter cake from the sealing composition described above, 6 lb/bbl of Class G cement, 250 gals/Mgals of HZ-10™ copolymer of acrylamide and t-butyl acrylate available from Halliburton Energy Services of Duncan, Okla., and 40 gals/Mgals of HZ-20™ polyethylene imine available from Halliburton Energy Services of Duncan, Okla., were combined to form a sealing composition. The sealing composition was a fluid, and the cement component was prone to slow settling, however this was remedied with light agitation. Alternatively, increased polymer concentrations can be used to prevent settling.

The sealing composition was conditioned at 180° F. and tested for fluid loss using a fluid loss cell and screen, such as is available from Fann Instrument Company, Houston, Tex. The fluid loss cell was refilled and re-pressurized each time the filter cake became dry. Testing ceased when fluid would no longer pass through the liter cake. The filter cake set hard and its average density, as determined by conventional means, was 14 ppg. After several hours, the filtrate set to a gel.

EXAMPLE 2

To test for collection of filter cake from the sealing composition described above, 8 lb/bbl of Class G cement, 135 gals/Mgals of Perm A™ 2-hydroxy ethyl acrylate monomer available from Halliburton Energy Services of Duncan, Okla., 3 lbs/Mgals of Perm D™ water soluble azo compound available from Halliburton Energy Services of Duncan, Okla., 18 gals/Mgals of WG-33 phosphonated hydroxyethyl cellulose viscosifying agent from Halliburton Energy Services of Duncan, Okla., and 1 gal/Mgals of BA-20>sodium acetate buffer solution from Halliburton Energy Services of Duncan, Okla., were combined to form a sealing composition.

Using a FANN 35 viscometer, the viscosity of the sealing composition was measured at three temperatures, and the FANN dial readings at the associated resolutions per minute ("rpm's") are listed in TABLE 1.

TABLE 1

| Conditions | FANN dial reading |
|---|---|
| FANN dial readings at 80° F. | |
| 600 rpm | 35 |
| 300 rpm | 24 |

TABLE 1-continued

| Conditions | FANN dial reading |
|---|---|
| 200 rpm | 19 |
| 100 rpm | 12 |
| 6 rpm | 3 |
| 3 rpm | 2 |
| FANN dial readings at 130° F. | |
| 600 rpm | 25 |
| 300 rpm | 16 |
| 200 rpm | 12 |
| 100 rpm | 8 |
| 6 rpm | 2 |
| 3 rpm | 1 |
| FANN dial readings at 175° F. | |
| 600 rpm | 17 |
| 300 rpm | 10 |
| 200 rpm | 8 |
| 100 rpm | 5 |
| 6 rpm | 2 |
| 3 rpm | 1 |

The sealing composition was a fluid which showed no tendency for cement settling at atmospheric temperature or bottom hole temperature. The sealing composition gelled after approximately two hours at 175° F.

A filter cake was produced by using sealing composition conditioned at 175° F. with a conventional fluid loss cell and screen. The fluid loss cell was refilled and re-pressurized each time the filter cake became dry. Testing ceased when fluid would no longer pass through the filter cake. The filter cake had a specific gravity of 2.18 and was very thin.

Although only a few exemplary embodiments of this invention have been described in detail above, those skilled in the art will readily appreciate that many other modifications are possible in the exemplary embodiments without materially departing from the novel teachings and advantages of this invention. Accordingly, all such modifications are intended to be included within the scope of this invention as defined in the following claims.

What is claimed is:

1. A method of performing a shut off operation in a subterranean zone penetrated by a well bore containing sequences of varying permeability comprising:
   preparing a sealing composition comprising gelling material, water, and cementitious material;
   introducing the sealing composition into the subterranean zone, whereby the sealing composition first enters the sequences having highest permeability;
   forming a filter cake to plug the highest permeability sequences;
   continuing to introduce the sealing composition until all of the sequences are plugged; and
   allowing the sealing composition to set therein.

2. The method of claim 1 wherein the cementitious material is fly ash, spherelite, Portland cement, pozzolan cement, gypsum cement, aluminous cement, silica cement, or alkaline cement.

3. The method of claim 1 wherein the cementitious material comprises class G cement.

4. The method of claim 1 wherein the sealing composition comprises from 0.005 to 0.5 mass percent of cementitious material.

5. The method of claim 1 wherein the gelling material comprises a 2-hydroxy ethyl acrylate monomer.

6. The method of claim 5 wherein the sealing composition comprises from 0.3 to 10 mass percent of gelling material.

7. The method of claim 1 wherein the gelling material comprises a copolymer of acrylamide and t-butyl acrylate.

8. The method of claim 7 wherein the sealing composition comprises from 3 to 10 mass percent of gelling material.

9. The method of claim 1 wherein the sealing composition comprises from 85 to 97 mass percent of water.

10. A method of performing a shut off operation in a subterranean zone penetrated by a well bore containing sequences of varying permeability comprising:

preparing a sealing composition comprising gelling material, water, and 0.005 to 0.5 mass percent of cementitious material;

introducing the sealing composition into the subterranean zone, whereby the sealing composition first enters the sequences having highest permeability;

forming a filter cake to plug the highest permeability sequences;

continuing to introduce the sealing composition until all of the sequences are plugged; and allowing the sealing composition to set therein.

11. A method of performing a shut off operation in a subterranean zone penetrated by a well bore containing sequences of varying permeability comprising:

preparing a sealing composition comprising gelling material, water, and cementitious material wherein the gelling material comprises a 2-hydroxy ethyl acrylate monomer;

introducing the sealing composition into the subterranean zone, whereby the sealing composition first enters the sequences having highest permeability; forming a filter cake to plug the highest permeability sequences; continuing to introduce the sealing composition until all of the sequences are plugged; and allowing the sealing composition to set therein.

12. The method of claim 11 wherein the sealing composition comprises from 0.3 to 10 mass percent of gelling material.

13. A method of performing a shut off operation in a subterranean zone penetrated by a well bore containing sequences of varying permeability comprising:

preparing a sealing composition comprising gelling material, water, and cementitious material wherein the gelling material comprises a copolymer of acrylamide and t-butyl acrylate;

introducing the sealing composition into the subterranean zone, whereby the sealing composition first enters the sequences having highest permeability; forming, a filter cake to plug the highest permeability sequences; continuing to introduce the sealing composition until all of the sequences are plugged; and allowing the sealing composition to set therein.

14. The method of claim 13 wherein the sealing composition comprises from 3 to 10 mass percent of gelling material.

* * * * *